United States Patent [19] [11] 3,810,122
Hecox [45] May 7, 1974

[54] READ ONLY MEMORY APPARATUS

[75] Inventor: William Hecox, Canal Winchester, Ohio

[73] Assignee: Exact Weight Scale Co., Inc., Columbus, Ohio

[22] Filed: June 30, 1971

[21] Appl. No.: 158,269

[52] U.S. Cl..... 340/173 LM, 340/347, 340/173 AM
[51] Int. Cl......................... G11c 11/42, G11c 15/00
[58] Field of Search.................. 340/173 L, 173 LM

[56] References Cited

UNITED STATES PATENTS 2,843,841 7/1958 King............................ 340/173 LM
3,569,944 3/1971 Bigelow........................ 340/173 LM
3,573,471 4/1971 Kolb........................... 340/173 LM

*Primary Examiner*—Terrell W. Fears
*Attorney, Agent, or Firm*—Cennamo, Kremblas & Foster

[57] ABSTRACT

A read-only memory apparatus which incorporates a novel data storing means preferably in the form of a rotatable disk. The code impressed on the disk is not related to shaft position information. The apparatus includes means for creating optical signals responsive to the coded disk and means for sensing and converting the optical signals into electrical signals. These signals are appropriately compared with predetermined reference signals for locating the desired data coded on the disk for retrieval upon command.

3 Claims, 3 Drawing Figures

INVENTOR
WILLIAM HECOX
BY
Cennamo Kremblas & Foster
ATTORNEYS

INVENTOR
WILLIAM HECOX
BY
*Cennamo Kremblas & Foster*
ATTORNEYS

READ ONLY MEMORY APPARATUS

BACKGROUND OF INVENTION

Prior to the present invention, data storing read-only memory devices were primarily of the magnetic core or drum type. These devices, however, are very expensive and economic considerations limit the possible uses in which automatic data retrieval apparatus might be used to increase efficiency and reduce labor costs.

GENERAL DESCRIPTION OF INVENTION

In general the apparatus of the present invention incorporates a novel data storage device in the form of a rotating disk provided with an optically sensed code. However, the code is not related to shaft position per se in contrast to the widely known, conventional shaft encoders wherein the code is directly related to the shaft position information.

The code is formed on the disk by a plurality of selectively placed opaque and at least translucent areas. A source of light is directed on the disk and optical sensing means are aligned on the opposite side of the disk to receive the optical signals and to convert them to electrical signals.

Upon coincidence of certain compared signals, the signal from the optical sensing means which represents the desired data is read and fed to automatic printing apparatus which reduces the data into a legible form.

It is therefore an object of the present invention to provide an apparatus of the type described which rapidly retrieves and records prestored information in a reliable manner.

It is another object of the present invention to provide an apparatus of the type described which permits the retrieval of stored information and yet which is many times less expensive than prior art methods and means.

It is still another object of the present invention to provide a low cost read-only memory apparatus which is much less susceptible to accidental destruction of the stored data as compared to prior methods and means.

It is another object of the present invention to provide an apparatus of the type described wherein the stored data is coded in a manner permitting parallel read out, that is, not dependent upon the direction of movement of the code past the optical sensing means.

It is a further object of the present invention to provide an apparatus of the type described with an improved and simplified electrical read out circuit which itself includes additional features to supply other information useful in a variety of applications.

Further objects and advantages of the present invention will be apparent from the following description, reference being had to the accompanying drawings wherein a preferred form of embodiment of the invention is clearly shown.

IN THE DRAWINGS

Figure 2:
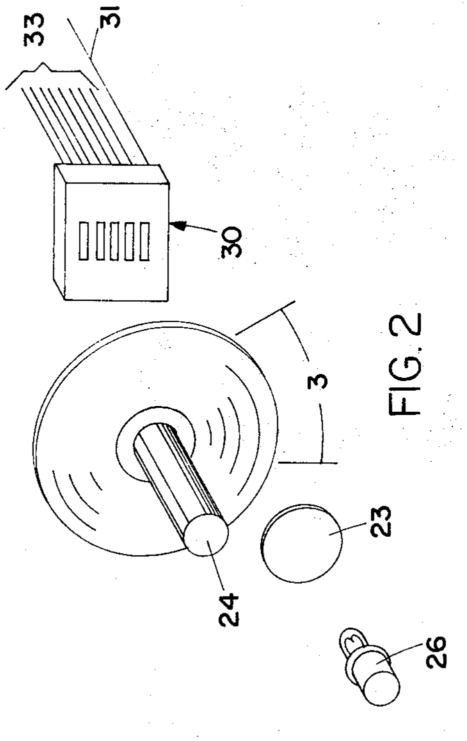
FIG. 2 is an illustrative perspective view of a portion of the apparatus shown in FIG. 1 illustrating the novel data storing means and associated optical sensing means.

A data storing or memory means, indicated generally at 20, and illustrated in detail in FIG. 2, includes a disk 22 mounted on a rotatable shaft 24 which is driven by a conventional motor, not shown. Disk 22 is constructed similarly to a conventional shaft encoder disk, however, it is important to point out that the code on disk 22 is non-analogous to shaft position and therefore fulfills a completely different purpose than the conventional shaft encoder.

In other words, shaft position information is not impressed on the disk as in the conventional usage of the shaft encoder. The data is merely stored on the disk and the disk moved in any suitable manner past a bank of photo-electrical cells as described below.

The code is formed by a plurality of opaque and at least translucent, but preferably transparent, areas arranged in a predetermined pattern as described in detail later herein.

A light source 26 may be focused through lens 23 on disk 22 as it is rotating to create optical signals on the opposite side of the disk responsive to the opaque and translucent areas.

A plurality of photo-electrical cells 30 function as optical sensing means and convert the optical signals to electrical signals responsive to the beam of light passing through a transparent area on the disk in alignment with a respective cell.

It should be readily understood that various types of information may be placed on the disk, such as for example, numerical charge schedules or the like for use in a parcel post delivery service.

Figure 1:
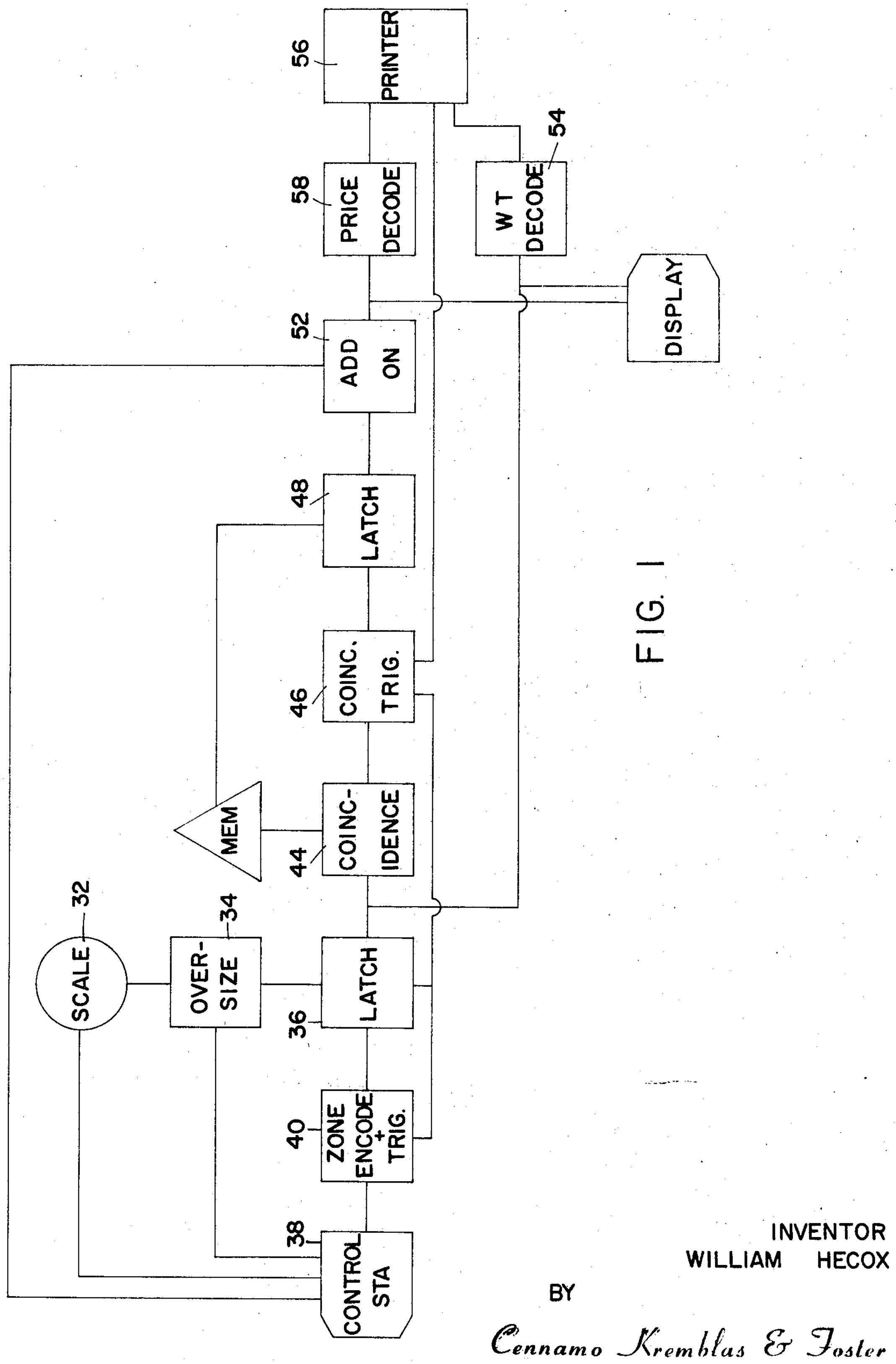
FIG. 1 is a diagrammatic view of a typical apparatus for information retrieval constructed in accordance with the present invention.
Figure 3:
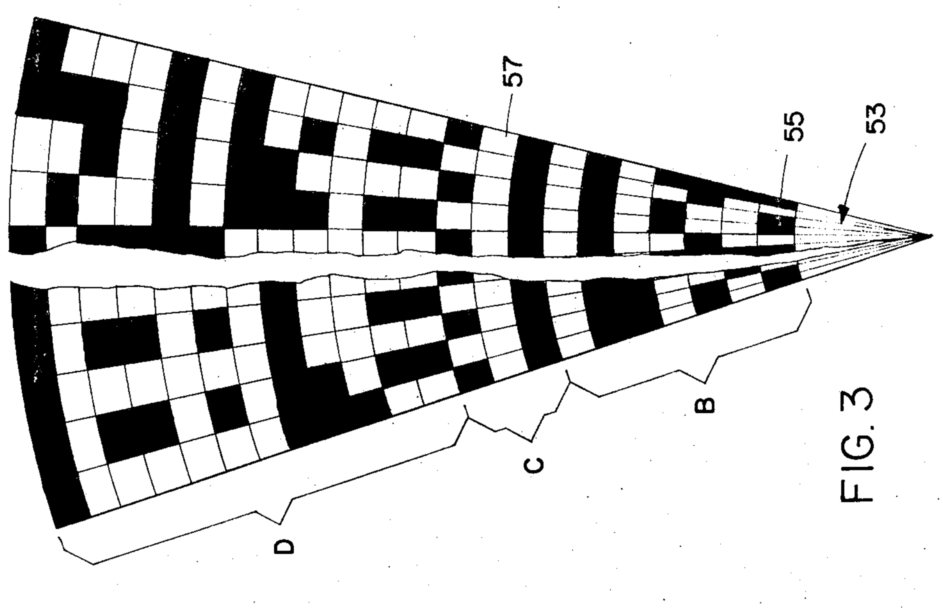
FIG. 3 is a partial front elevational view of a disk forming a portion of the apparatus of the present invention.

For example, a typical code is illustrated in FIG. 3 which shows a portion of disk 22 wherein the code is for a rate schedule used in a parcel post delivery service. The rates vary according to the weight of the parcel and the particular arbitrary geographical area or "zone" to which the parcel will be delivered.

In the xample shown, a plurality of arcuate segments, indicated generally at 53, are divided by twenty-two tracks formed by a plurality of concentric circles such as 55. The intersection between the tracks and segments 53 define a plurality of areas such as 57.

For purpose of illustration only, the segments and concentric circles are actually shown in FIG. 3 however, on an actual disk manufactured by a photographic process, the individual circles and segments do not appear as such. Also the opaque areas on the disk are merely indicated by being shaded.

These areas comprise a Gray code wherein an abitrary combination of transparent and opaque areas represent a given location on the disk. This code is designed so that only one code column changes relative to adjacent columns. Each column signifies a given weight and the seven areas in Group Be permit a representation of from 0 to 127 pounds.

In a typical parcel post delivery program, the rates vary for parcels between 0 to 50 pounds at one pound graduations and also rates may vary for particular predetermined geographical "zones" to which the parcel will be delivered.

In the particular embodiment shown, the next group designated at C contains three areas 57 which are also Gray coded to permit the representation of at least seven different zones.

Groups B and C represent address or indexing data and the photocells 30 which are aligned therewith are operatively connected to a comparator 44 as described in detail later herein.

The next 12 areas 57, designated in FIG. 3 at D, represent price information. These areas are coded in binary form. The first four represent the numerical quantities 1, 2, 4 and 8 to permit representation of any digit between 0 and 9. Therefore three such groups of areas permit representation of any price between 0 and 9 dollars and 99 cents.

From the foregoing description, it should therefore be understood that the code on disk 22 represents stored weight information, zone information and price information.

Now referring to FIG. 3, a typical embodiment of the present invention is illustrated in block diagram form and includes a conventional weighing scale provided with transducing means preferably in the form of a seven bit binary shaft encoder, and is indicated generally at 32. This signal is fed through an override station 34 to a first latch register 36.

The override station 34 is merely by-passed unless an oversized package is encountered by the operator. In the particular example described herein, this situation is for packages under a predetermined weight but over a given size which are treated as weighing a given amount and charged accordingly. A manually actuated switch is provided on the control panel, indicated at 38, which feeds a given signal into latch 36 via override station 34 overriding the signal from scale 32.

Means for producing a second reference or indexing signal is provided, and preferably is in the form of a conventional manually actuated encoding means. As shown in FIG. 4, seven push buttons are provided on control panel 38 which represent seven different zones and are operatively connected to a conventional encoding means indicated at 40 in FIG. 3.

An eighth button represents an insurance or C.O.D. charge and actuates the printing of a separate ticket indicating an additional charge which is predetermined by setting dial 42. This eighth button actuates a signal representing an impossible weight code combination and an arbitrary zone signal is chosen according to the setting of dial 42 to correspond to a zone reflecting a given price code on disk 22 having the value of the C.O.D. or Insurance charge desired.

Zone encoder 40 is operatively connected to latch 36 and also functions to trigger latch 36 and to prime or reset a coincidence trigger 46 which is responsive to a coincident signal from a conventional comparator 44.

Comparator 44 is operatively connected to and compares the signal outputs from latch 36 and the address bank of photocells 30 aligned with the respective areas 57 in Groups B and C.

Coincidence trigger 46 after being primed by the operator manually actuating one of the zone buttons on control panel 38, is programmed to actuate a second latch register 48 operatively connected to the price information bank of cells 30 aligned with the areas in Group D to store the instant signal being received therefrom upon the second coincident signal from comparator 44. This is desirable to ensure a completely reliable capture of the price data signal from cells 30 aligned with Group D. For example, a partial coincidence may occur between the reference or indexing signal from latch 36 and the date signal from cells 30 if the segment of disk 22 carrying the desired data has partially passed the respective cells 30 at the instant the reference signal is released from first latch register 36. Under this condition, it is possible that an incomplete signal would be received by the second register 48. However, by programming the coincidence trigger 46 to actuate the capture of the signal from cells 30 aligned with the Group D areas upon the second coincidence signal from comparator 44 this possibility of a partial or incomplete capture is eliminated.

An additive signal is provided for by add-on switch 50 manually manipulated on control panel 38. In the instant example, this add-on signal represents an extra out-of-zone charge for packages to be delivered from one zone to another. Switch 50 may be operatively connected to any conventional source such as a diode excoder which delivers this add-on signal to the price signal released from latch 48 as at 52.

The weight signal from scale 32 which is initially delivered to latch 36 is separately read by operatively connecting the output signal from latch 36 to a conventional decoder means 54 and conventional automatic ticket printer 56, such as for example, the type commerically available from National Cash Register Company.

The price information is also separately decoded at 58 and delivered to ticket printer 56 so that the weight and price are printed on a standard gum label which the operator may then simply afix to the package. A separate shipping paper is also printed with this information for record keeping.

If desired the weight and price information can be fed to a conventional visual "read-out" display means, such as at 60.

We claim:

1. In a read only memory device, the combination of

A. means carrying a permanent code formed by a plurality of opaque and diaphonous areas arranged in a predetermined pattern representing stored data and unique address information for each bit of stored data, said means being mounted for sequential movement past a defined position;

B. a source of light directed upon said defined position for producing optical signals responsive to said code;

C. photosensing means disposed on the opposite side of means (A) relative to said source of light and aligned with said defined position for parallel sensing and converting said optical signals to electrical signals, said photosensing means including address reading means and stored data reading means for simultaneous read of said address information and stored data;

D. address selection means for producing indexing signals comparable with signals derived from said address reading means;

E. first storage means operatively connected to said means (D);

F. comparator means having one input operatively connected to said photosensing means aligned with said address information and a second input operatively connected to said storage means (E) for developing an output signal upon coincidence between said input signals;

G. second storage means operatively connected to that portion of said photosensing means aligned with the coded stored data;

H. first trigger means operatively connected to said means (E) to actuate release of the information stored therein to one input of said comparator means (F); and I. second trigger means operatively connected to said comparator means (F), said second trigger means being operative to provide an output signal to actuate said means (G) to capture the instant signal being received from said photosensing means upon receiving at least two coincidence signals from comparator means (F).

2. In a read only memory device, the combination of

A. means carrying a permanent code formed by a plurality of opaque and diaphonous areas arranged in a predetermined pattern representing address information and stored data and mounted for sequential movement past a defined position;

B. a source of light directed upon said defined position which includes at least a portion of said code to produce optical signals responsive to said code;

C. photosensing means disposed on the opposite side of said means carrying said code relative to said source of light and aligned therewith for sensing and converting said optical signals to electrical signals;

D. address selection means for producing indexing signals comparable with said signals derived from said coded address information;

E. first storage means operatively connected to said means (D);

F. comparator means having one input operatively connected to said photosensing means aligned with said address information and a second input operatively connected to said storage means (E) for developing an output signal upon coincidence between said input signals;

G. second storage means operatively connected to that portion of said photosensing means aligned with the coded stored data;

H. first trigger means operatively connected to said means (E) to actuate release of the information stored therein to one input of said comparator means (F);

I. second trigger means operatively connected to said comparator means (F), said second trigger means being programmed to provide an output signal to actuate said means (G) to capture the instant signal being received from said photosensing means upon receiving at least two coincidence signals from comparator means (F);

J. means operatively connected to said means (G) for converting said stored information into humanly readable form.

3. The device defined in claim 2 including (K) means for selectively producing a predetermined signal representing additive stored data, said means (K) being operatively connected to said means (J).

* * * * *